United States Patent
Lee (10) Patent No.: US 9,494,774 B2
(45) Date of Patent: Nov. 15, 2016

(54) IMAGING LENS

(71) Applicant: LG INNOTEK CO., LTD., Seoul (KR)

(72) Inventor: Kyung Hwan Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 184 days.

(21) Appl. No.: 14/355,184

(22) PCT Filed: Oct. 17, 2012

(86) PCT No.: PCT/KR2012/008467
§ 371 (c)(1),
(2) Date: Apr. 29, 2014

(87) PCT Pub. No.: WO2013/065972
PCT Pub. Date: May 10, 2013

(65) Prior Publication Data
US 2014/0268362 A1 Sep. 18, 2014

(30) Foreign Application Priority Data

Oct. 31, 2011 (KR) .................... 10-2011-0112212

(51) Int. Cl.
*G02B 9/60* (2006.01)
*G02B 15/14* (2006.01)
*G02B 13/00* (2006.01)

(52) U.S. Cl.
CPC ............. *G02B 15/14* (2013.01); *G02B 13/009* (2013.01); *G02B 13/0045* (2013.01)

(58) Field of Classification Search
CPC G02B 15/14; G02B 13/009; G02B 13/0045; G02B 9/60
See application file for complete search history.

(56) References Cited

U.S. PATENT DOCUMENTS

2010/0220229 A1* 9/2010 Sano .................. G02B 13/0045
348/340
2011/0176049 A1 7/2011 Hsieh et al.

FOREIGN PATENT DOCUMENTS

| CN | 101051110 A | 10/2007 |
| CN | 101819315 A | 9/2010 |
| CN | 101995641 A | 3/2011 |
| JP | 05-011181 A | 1/1993 |
| JP | 07-253540 A | 10/1995 |
| JP | 09-113806 A | 5/1997 |
| JP | 2002-082271 A | 3/2002 |
| JP | 2002522809 A | 7/2002 |
| JP | 2009156950 A | 7/2009 |
| JP | 2010145591 A | 7/2010 |
| JP | 2010-197665 A | 9/2010 |
| JP | 2010-224521 A | 10/2010 |
| TW | 201102690 A | 1/2011 |
| TW | 201135304 A | 10/2011 |

OTHER PUBLICATIONS

Office Action dated Oct. 19, 2015 in Chinese Application No. 201280053663.9.
International Search Report in International Application No. PCT/KR2012/008467, filed Oct. 17, 2012.
Office Action dated May 18, 2016 in Chinese Application No. 201280053663.9.
Office Action dated May 23, 2016 in Taiwanese Application No. 10520625650.

* cited by examiner

*Primary Examiner* — Joseph P Martinez
(74) *Attorney, Agent, or Firm* — Saliwanchik, Lloyd & Eisenschenk (57) ABSTRACT

The present invention relates to an imaging lens, the imaging lens including, in an ordered way from an object side, a first movable lens having a positive (+) refractive power, a second lens having a negative (−) refractive power, a third lens having a positive (+) refractive power, a fourth lens having a positive (+) refractive power, and a fifth lens having a negative (−) refractive power.

22 Claims, 8 Drawing Sheets

IMAGING LENS

CROSS-REFERENCE TO RELATED APPLICATIONS

This application is the U.S. national stage application of International Patent Application No. PCT/KR2012/008467, filed Oct. 17, 2012, which claims priority to Korean Application No. 10-2011-0112212, filed Oct. 31, 2011, the disclosures of each of which are incorporated herein by reference in their entirety.

TECHNICAL FIELD

The teachings in accordance with exemplary embodiments of this invention relate generally to an imaging lens.

BACKGROUND ART

Vigorous research efforts are being made recently in the field of a mobile phone-purpose camera module, a digital still camera (DSC), a camcorder, and a PC camera (an imaging device attached to a person computer) all connected with an image pickup system. One of the most important components in order that a camera module related to such an image pickup system obtains an image is an imaging lens producing an image.

Recently, an optical lens system is constructed by using 5 pieces of lenses for compactness and low cost. Each of 5 pieces of lenses is comprised of lenses with a positive (+) refractive power and lenses with a negative (−) refractive power.

However, although the 5-piece lens system may be advantageous in price, but in some cases, an image module of the above-mentioned structure fails to show satisfactory optical properties or aberration properties, and thus a high resolution imaging lens having a power structure is required.

DISCLOSURE OF INVENTION

Technical Problem

Accordingly, embodiments of the present invention may relate to an imaging lens that substantially obviates one or more of the above disadvantages/problems due to limitations and disadvantages of related art, and it is an object of the present invention to provide an imaging lens configured to realize a compact zoom-type imaging lens capable of auto focusing with a high resolution, a high power structure and a wide angle.

Solution to Problem

In one general aspect of the present invention, there is provided an imaging lens, the imaging lens comprising, in an ordered way from an object side: a first movable lens having a positive (+) refractive power; a second lens having a negative (−) refractive power; a third lens having a positive (+) refractive power; a fourth lens having a positive (+) refractive power; and a fifth lens having a negative (−) refractive power.

Preferably, but not necessarily, the second lens is concavely formed with a negative (−) refractive power.

Preferably, but not necessarily, the third lens has a meniscus shape convexly formed at an object side surface.

Preferably, but not necessarily, the fourth lens has a meniscus shape.

Preferably, but not necessarily, the third lens is formed at a front surface with all inflection points.

Preferably, but not necessarily, all surfaces of the third, fourth and fifth lenses are formed with one or more inflection points.

Preferably, but not necessarily, an aperture is positioned at a front end of an object side surface of the first lens.

Preferably, but not necessarily, the imaging lens meets a conditional expression of $0.5 < f1/fz1 < 1.5$, $0.5 < f1/fz2 < 1.5$, $0.5 < f1/fz3 < 1.5$, where f1 is an entire focus distance (focal length) of the first lens, and fz1, fz2 and fz3 are focus distances of zoom positions 1, 2 and 3, and where the zoom position 1 is an infinite position, the zoom position 2 is a 60 cm (middle) position and the zoom position 3 is a 10 cm (wide) position.

Preferably, but not necessarily, the imaging lens meets a conditional expression of $0.1 < d1 < 0.4$, $0.15 < d3 < 0.54$, where d1 is an air clearance between L1 center and L2 center on a zoom position 1, and d2 is an air clearance between L1 center and L2 center on a zoom position 3.

Preferably, but not necessarily, the imaging lens meets a conditional expression of $0.5 < \Sigma T/fz1 < 1.5$, $0.5 < \Sigma T/fz2 < 1.5$, $0.5 \Sigma T/fz3 < 1.5$, where $\Sigma T$ is a distance from an object side surface of the first lens to an image-forming surface, and fz1, fz2 and fz3 are focus distances of zoom positions 1, 2 and 3.

Preferably, but not necessarily, the imaging lens meets a conditional expression of $1.6 < N2 < 1.7$, $1.6 < N3 < 1.7$, $1.5 < N1 < 1.6$, $1.5 < N4 < 1.6$, $1.5 < N5 < 1.6$, where N1, N2, N3, N4 and N5 are refractive indexes of first, second, third, fourth and fifth lenses.

Preferably, but not necessarily, the imaging lens meets a conditional expression of $20 < V2 < 30$, $20 < V3 < 30$, $50 < V1 < 60$, $50 < V4$ & $V5 < 60$, $50 < V5 < 60$, where V1, V2, V3, V4 and V5 are Abbe's numbers of the first, second, third, fourth and fifth lenses.

Preferably, but not necessarily, the imaging lens meets a conditional expression of $4.7 < \Sigma T < 5.9$, where $\Sigma T$ is a distance from an object side surface of the first lens to an image-forming surface.

Preferably, but not necessarily, the imaging lens meets a conditional expression of $2.0 < F/\# < 3.0$, where F/# is an F-number.

Preferably, but not necessarily, the imaging lens meets a conditional expression of $0.8 < f3/f1 < 1.0$, where f1 and f3 are focus distances (focal lengths) of the first and third lenses.

Preferably, but not necessarily, the imaging lens meets a conditional expression of $L3R1 > 1$, $L3R2 > 1$, where a radius of curvature of a first surface of the third lens is L3R1, and a radius of curvature of a second surface of the third lens is L3R2.

Preferably, but not necessarily, the imaging lens meets a conditional expressions of $0.8 < |f2/fz1| < 1.2$, $0.8|f2/fz2| < 1.2$, $0.8 < |f2/fz3| < 1.2$, $0.8 < |f3/fz1| < 3.8$, $0.8 < |f3/fz2| < 3.7$, $0.8 < |f3/fz3| < 3.7$, $0.8 < |f4/fz1| < 1.0$, $0.8 < |f4/fz2| < 1.0$, $0.8 < |f4/fz3| < 1.0$, $0.8 < |f5/fz1| < 0.8$, $0.8 < |f5/fz2| < 0.8$, $0.8 < |f5/fz3| < 1.0$, 0.8, where f1, f2, f3, f4 and f5 are focus distances of the first, second, third, fourth and fifth lenses, and fz1, fz2 and fz3 are focus distances of zoom positions 1, 2 and 3.

Preferably, but not necessarily, the imaging lens meets a conditional expression of $0.7 < (r3+r4)/(r3-r4) < 1.0$, where r3 and r4 are respectively radius of curvature of an object side surface of the second lens and radius of curvature of an image side surface.

Preferably, but not necessarily, the imaging lens meets a conditional expression of $4.0 < |(r5 + r6)/(r5 - r6)| < 8.0$, where r5 and r6 are respectively radius of curvature of an object side surface of the third lens and radius of curvature of an image side surface.

Preferably, but not necessarily, the imaging lens meets a conditional expression of 0.4<f1 ΣT<0.8, or 2.5<|f3/ΣT|<3.0, where ΣT is a distance from an object side surface of the first lens to an image-forming surface, and f1 and f3 are focus distances of first and third lenses.

Advantageous Effects of Invention

The imaging lens according to the present invention has an advantageous effect in that an auto focusing is enabled by moving one piece of lens. Another advantageous effect is that a compact, zoom type and high resolution imaging lens having a high power structure can be realized.

BEST MODE FOR CARRYING OUT THE INVENTION

Hereinafter, exemplary embodiments of the present invention will be described in detail with reference to the accompanying drawings.

In describing the present invention, detailed descriptions of constructions or processes known in the art may be omitted to avoid obscuring appreciation of the invention by a person of ordinary skill in the art with unnecessary detail regarding such known constructions and functions. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Now, the imaging lens according to exemplary embodiments of the present invention will be described in detail with reference to the accompanying drawings.

Figure 1:
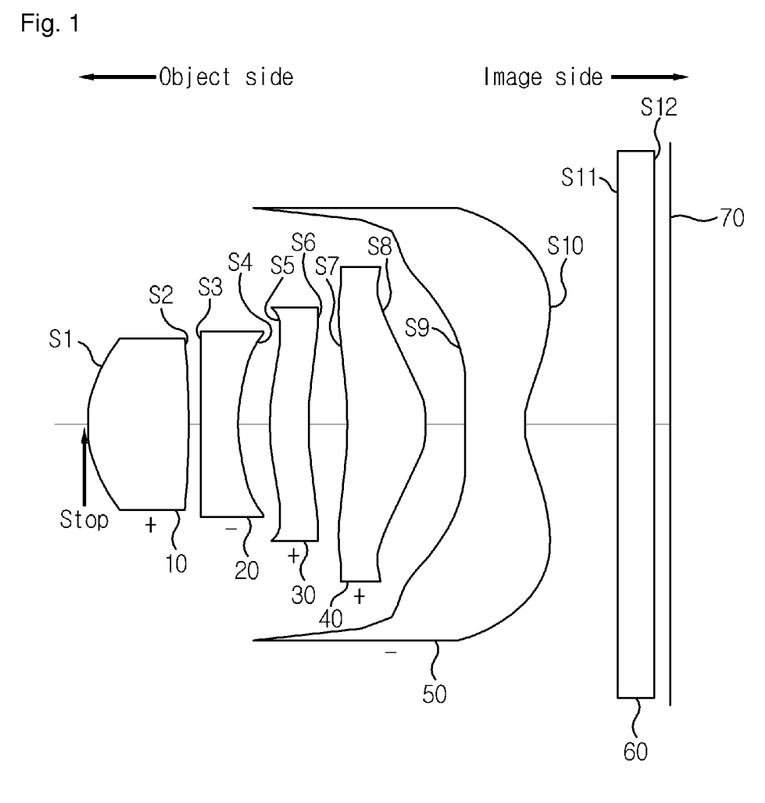
FIG. 1 is a constructional view illustrating a camera module lens according to an exemplary embodiment of the present invention.

FIG. 1 is a constructional view illustrating an imaging lens according to an exemplary embodiment of the present invention.

The imaging lens formed with a plurality of lenses is arranged about an optical axis (ZO), where thickness, size, and shape of each lens are rather overdrawn in FIG. 1 for description, and a spherical shape or an aspheric shape has been only presented as one exemplary embodiment, but obviously not limited to this shape.

Referring to FIG. 1, a camera lens module according to an exemplary embodiment of the present invention includes, in an ordered way from an object side, a first lens (10), a second lens (20), a third lens (30), a fourth lens (40), a fifth lens (50), a filter (60) and a photo-detector (light receiving element, 70).

Light corresponding to image information of a subject is incident on the photo-detector (70) by passing the first lens (10), the second lens (20), the third lens (30), the fourth lens (40), the fifth lens (50) and the filter (60).

Hereinafter, in the description of the construction of each lens, "object side surface" means a surface of a lens facing an object side with respect to an optical axis, and "image side surface" means a surface of a lens facing a capturing surface with respect to an optical axis.

A first lens (10) has a positive (+) refractive power. Furthermore, the first lens (10) may be positioned at a front end of an object side surface with an aperture, where the first lens (10) is movable for auto focusing. That is, the first lens (10) performs the auto focusing by being moved by an actuator.

A second lens (20) is a concave lens having a negative (−) refractive power. A third lens (30) takes a shape of a meniscus form and has a positive (+) refractive power.

A fourth lens (40) takes a shape of a meniscus form and has a negative (+) refractive power. In addition, the second lens (20) is formed at a front surface with all inflection points, and all surfaces of the third, fourth and fifth lenses (30, 40, 50) are formed with one or more inflection points.

Thus, the present invention can auto focus by moving one piece of lens. Furthermore, the present invention takes a zoom shape and is configured to realize a compact zoom-type imaging lens capable of auto focusing with a high resolution, a high power structure.

For information, 'S1' of FIG. 1 is an object side surface of the first lens (10), 'S2' is an image side surface of the first lens (10), 'S3' is an object side surface of the second lens (20), 'S4' is an image side surface of the second lens (20), 'S5' is an object side surface of the third lens (30), 'S6' is an image side surface of the third lens (30), and 'S7' and 'S8' are respectively an object side surface and an image side surface of the fourth lens (40), 'S9' and 'S1' are respectively an object side surface and an image side surface of the fifth lens (50), and 'S11' and 'S12' are respectively an object side surface and an image side surface of the filter (60).

The filter (60) may be any one optical filter selected from an infrared filter and a cover glass. The filter (50), if applied with the infrared filter, prevents radiant heat emitted from external light from being transferred to the photo-detector (70). Furthermore, the infrared filter transmits visible light and reflects and outputs infrared rays to the outside. The photo-detector (60) is an image sensor, for example, CCD (Charge Coupled Device) or CMOS (Complementary Metal Oxide Semiconductor), etc.

Because the later-described conditional expressions and exemplary embodiments are preferred embodiments enhancing an effect of interaction, it would be obvious to those skilled in the art that the present invention is not necessarily comprised of the following conditions. For example, only by satisfying some conditions of later-described conditional expressions, the lens construction (framework) of the present invention may have an enhanced effect of interaction.

$0.5 < f1/fz1 < 1.5,\ 0.5 < f1/fz2 < 1.5,\ 0.5 < f1/fz3 < 1.5$     [Conditional expression 1]

$0.1 < d1 < 0.4,\ 0.15 < d3 < 0.54$     [Conditional expression 2]

$0.5 < \Sigma T/fz1 < 1.5,\ 0.5 < \Sigma T/fz2 < 1.5,\ 0.5 < \Sigma T/fz3 < 1.5$     [Conditional expression 3]

| | |
|---|---|
| 1.6<N2<1.7, 1.6<N3<1.7, 1.5<N1<1.6, 1.5< N4<1.6, 1.5<N5<1.6 | [Conditional expression 4] |
| 20<V2<30, 20<V3<30, 50<V1<60, 50<V4 & V5<60, 50<V5<60 | [Conditional expression 5] |
| 4.7<ΣT<5.9 | [Conditional expression 6] |
| 2.0<F/#<3.0 | [Conditional expression 7] |
| 0.8<f3/f1<1.0 | [Conditional expression 8] |
| L3R1>1, L3R2>1 | [Conditional expression 9] |
| 0.8<|f2/fz1|<1.2, 0.8|f2/fz2|< 1.2, 0.8<|f2/fz3|<1.2, | [Conditional expression 10] |
| 0.8<|f2/fz1|<3.7, 0.8<|f3/fz2|<3.7, 0.8< |f3/fz3|<3.7 | [Conditional expression 11] |
| 0.8<|f4/fz1|<1.0, 0.8<|f4/fz2|<1.0, 0.8< |f4/fz3|<1.0 | [Conditional expression 12] |
| 0.8<|f5/fz1|<0.8, 0.8<|f5/fz2|<0.8, 0.8< |f5/fz3|<0.8 | [Conditional expression 13] |
| 0.7<(r3+r4)/(r3−r4)<1.0 | [Conditional expression 14] |
| 4.0<|(r5+r6)/(r5−r6)|<8.0 | [Conditional expression 15] |
| 0.4<f1/ΣT<0.8 | [Conditional expression 16] |
| 2.5<|f3/ΣT|<3.0 | [Conditional expression 17] | where, f: an entire focus distance (focal length) of the imaging lens, fz1, fz2, fz3: a focus distance of zoom positions 1, 2 and 3, f1, f2, f3, f4, f5: focus distances of first, second, third, fourth and fifth lenses, d1: an air clearance between L1 center and L2 center on a zoom position 1, d2: an air clearance between L1 center and L2 center on a zoom position 3, ΣT: a distance from an object side surface of the first lens to an image-forming surface, N1, N2, N3, N4, N5: refractive indexes of first, second, third, fourth and fifth lenses, V1, V2, V3, V4, V5: Abbe's numbers of the first, second, third, fourth and fifth lenses, F/#: F-number, L3R1: a radius of curvature of a first surface of the third lens is L3R1

L3R2: a radius of curvature of a second surface of the third lens is L3R2, r3, r4: radius of curvature of an object side surface of the second lens, and radius of curvature of an image side surface of the second lens, r5, r6: radius of curvature of an object side surface of the third lens and radius of curvature of an image side surface of the third lens.

Conditional expression 4 specifies refractive powers of the first, second, third, fourth and fifth lenses (10, 20, 30, 40, 50), the first, second, third, fourth and fifth lenses (10, 20, 30, 40, 50) have refractive powers each having an appropriate compensation of spherical aberration and appropriate chromatic aberration according to the conditional expression 4, and conditional expression 5 specifies Abbe's number of first, second, third, fourth and fifth lenses (10, 20, 30, 40, 50). The specification of Abbe's number of each lens is a condition for better compensation of chromatic aberration.

Hereinafter, the action and effect of the present invention will be described with reference to a specific exemplary embodiment. Aspheric mentioned in a later-exemplary embodiment is obtained from a known Equation 1, and 'E and its succeeding number' used in Conic constant k and aspheric coefficient A, B, C, D, E, F indicates 10's power. For example, E+01 denotes $10.^1$, and E−02 denotes $10.^{-2}$.

MathFigure 1

$$Z = \frac{cY^2}{1+\sqrt{1-(1+K)c^2Y^2}} + AY^4 + BY^4 + CY^4 + DY^4 + EY^{4+}FY^4 + \ldots \quad [\text{Math. 1}]$$

where, z: distance from the lens's top-point to an optical axis direction, c: basic curvature of a lens, Y: distance towards a direction perpendicular to an optical axis, K: conic constant, and A, B, C, D, E, F: aspheric coefficients

[Exemplary Embodiments]

The following Table 1 shows an exemplary embodiment matching the aforementioned conditional expressions.

TABLE 1

| | Exemplary embodiment |
|---|---|
| fz1(Tele) Infinite | 4.0045 |
| fz2(Middl1e) 60 cm | 3.9879 |
| fz3(Wide) 10 cm | 3.9041 |
| f1 | 2.91 |
| f2 | −3.84 |
| f3 | 13.59 |
| f4 | 3.40 |
| f5 | −2.76 |
| f1/fz1 | 0.727 |
| f1/fz2 | 0.730 |
| f1/fz3 | 0.745 |
| d1 | 0.1 |
| d3 | 0.18 |
| Σ | 4.8 |
| ΣT/fz1 | 1.199 |
| ΣT/fz2 | 1.204 |
| ΣT/fz3 | 1.229 |
| N1 | 1.53 |
| V1 | 56.5 |
| N2 | 1.63 |
| V2 | 23.9 |
| N3 | 1.63 |
| V3 | 23.9 |
| N4 | 1.53 |
| V4 | 56.5 |
| N5 | 1.53 |
| V5 | 56.5 |

Referring to Table 1, it can be noted that f1/fz1 is 0.73 that matches the conditional expression 1, and |f2/fz1| is 0.95 that matches the conditional expression 8.

The following Table 2 shows an exemplary embodiment which is a more detailed exemplary embodiment over that of Table 1.

TABLE 2

| Surface number | Curvature radius (R) | Thickness or distance (d) | RefractiveIndex (N) |
|---|---|---|---|
| Stop* | 1.17 | 0.83 | 1.53 |
| 2* | −13.74 | 0.100.110.18 | |
| 3* | −60.31 | 0.31 | 1.63 |

TABLE 2-continued

| Surface number | Curvature radius (R) | Thickness or distance (d) | RefractiveIndex (N) |
|---|---|---|---|
| 4* | 2.58 | 0.26 | |
| 5* | 2.71 | 0.32 | 1.63 |
| 6* | 3.76 | 0.32 | |
| 7* | −4.46 | 0.63 | 1.53 |
| 8* | −1.35 | 0.33 | |
| 9* | 5.80 | 0.50 | 1.53 |
| 10* | 1.12 | 0.76 | |
| 11 | Infinity | 0.3 | 1.53 |
| 12 | Infinity | 0.140.150.16 | |
| image | Infinity | 0.00-0.01-0.02 | |

The notation * in the above Table 2 and following Table 3, which is further written near the surface number, indicates aspheric. The following Tables 3 and 4 respectively show a value of aspheric coefficient of each lens in the exemplary embodiment of Table 2.

TABLE 3

| Surface number | k | A | B | C | D | E |
|---|---|---|---|---|---|---|
| 1* | −0.7482 | 0.0150 | −0.0021 | −0.0078 | 0.0198 | −0.0159 |
| 2* | 0.0000 | 0.0050 | −0.0207 | 0.0558 | −0.0441 | −0.0024 |
| 3* | 0.0000 | −0.0250 | 0.0871 | −0.0942 | 0.0912 | −0.0447 |
| 4* | −21.3296 | 0.0670 | 0.0219 | −0.0047 | −0.0108 | 0.0150 |
| 5* | 0.0000 | −0.1539 | 0.0633 | −0.0251 | 0.0199 | −0.0133 |
| 6* | 0.0000 | −0.0689 | −0.0265 | 0.0347 | −0.0069 | −0.0006 |
| 7* | −25.1416 | 0.0480 | −0.0204 | −0.0124 | 0.0156 | −0.0037 |
| 8* | −0.8758 | 0.1065 | −0.0113 | 0.0016 | 0.0019 | −0.0006 |
| 9* | −473.3930 | −0.2013 | 0.1136 | −0.0469 | 0.0113 | −0.0010 |
| 10* | −7.1883 | −0.0945 | 0.0375 | −0.0113 | 0.0018 | −0.0001 |

Mode for the Invention

Figure 2A:
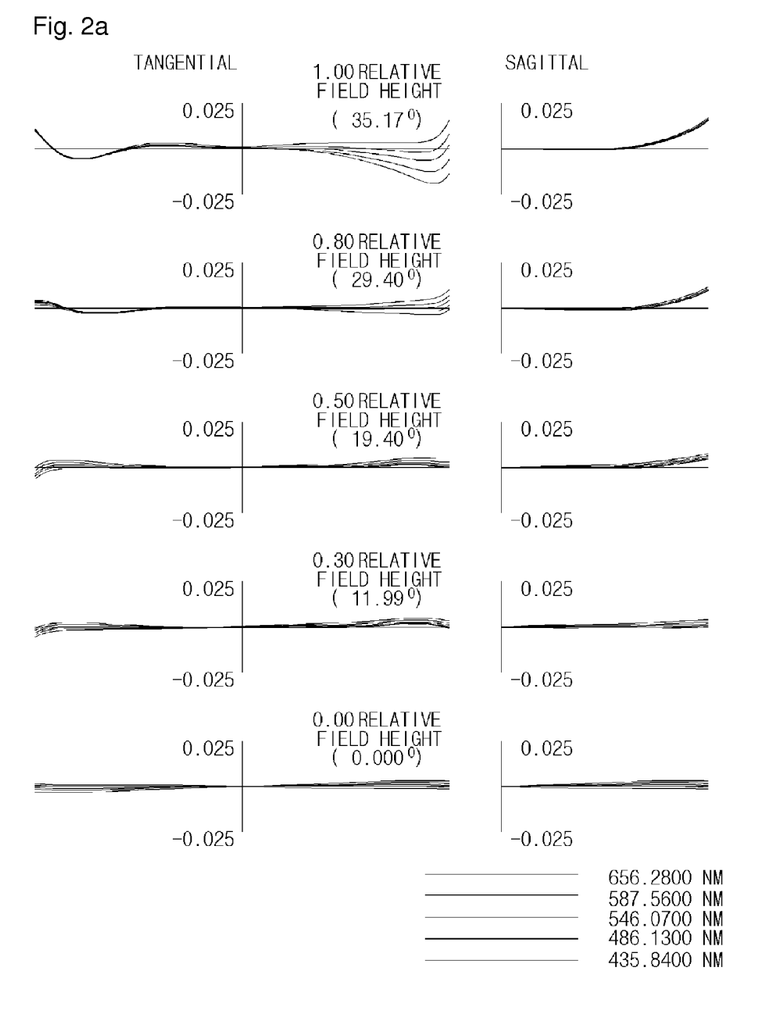
FIGS. 2a, 2b and 2c are graphs measuring a coma aberration at zoom positions 1, 2 and 3 according to an exemplary embodiment of the present invention.
Figure 2B:
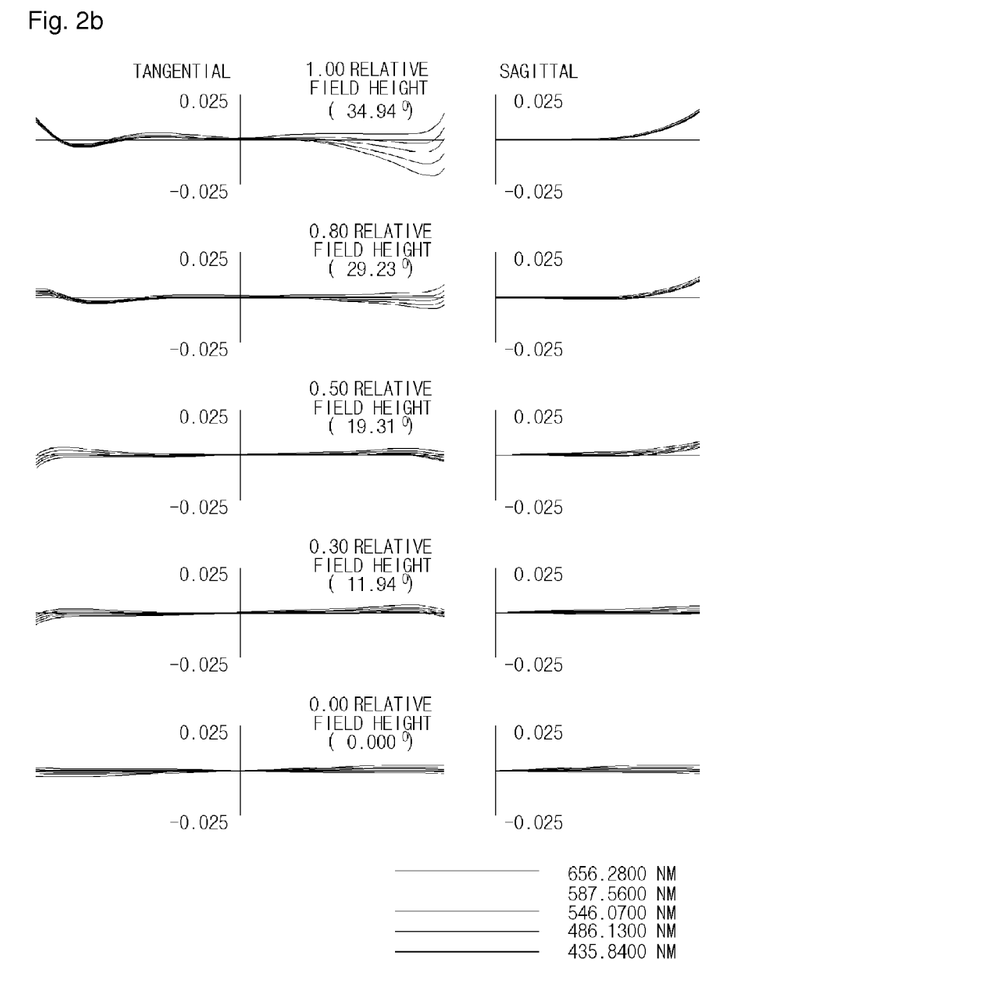
Figure 2C:
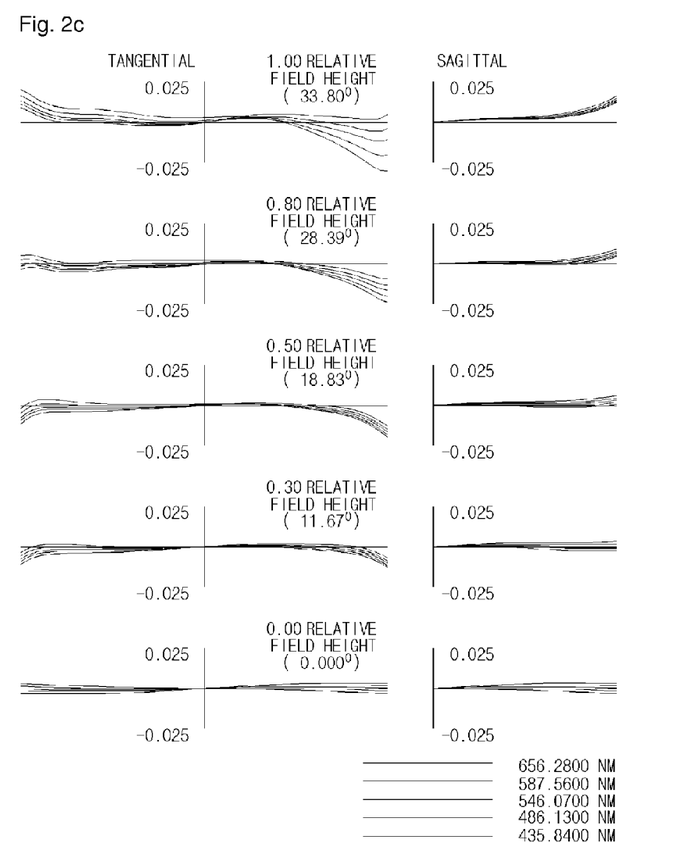

FIGS. 2a, 2b and 2c are graphs illustrating coma aberration at zoom positions 1, 2 and 3 according to an exemplary embodiment of the present invention, where tangential aberration and sagittal aberration of each wavelength based on a field height are measured. In FIGS. 2a, 2b and 2c, it is interpreted that a coma aberration correcting function is good as curves approach the X axis from a positive axis and a negative axis. In the measurement examples of FIGS. 2a, 2b and 2c of shown aberration diagrams, because values of images in nearly all fields proximate to the X axis, coma aberration correction function demonstrates a superior figure.

For reference, FIG. 2a is a graph where coma aberration is measured at the zoom position 1 of an infinite position, FIG. 2b is a graph where coma aberration is measured at the zoom position 2 of 60 cm (middle) position, and FIG. 2c is a graph where coma aberration is measured at the zoom position 3 of 10 cm (wide) position.

Figure 3A:
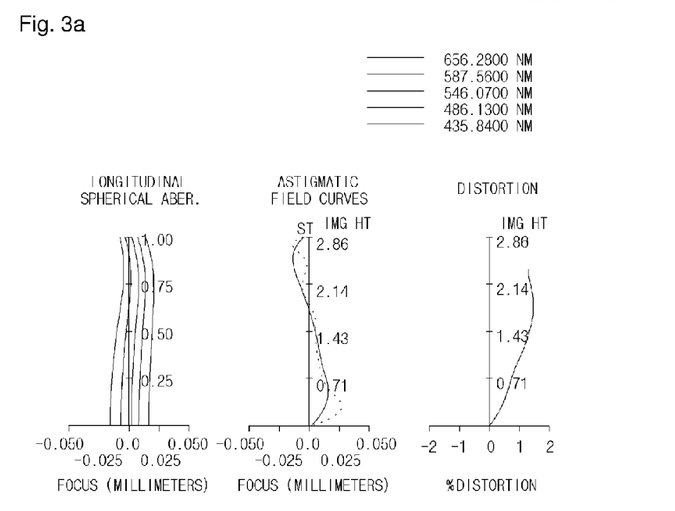
FIGS. 3a, 3b and 3c are graphs illustrating an aberration at zoom positions 1, 2 and 3 according to an exemplary embodiment of the present invention.
Figure 3B:
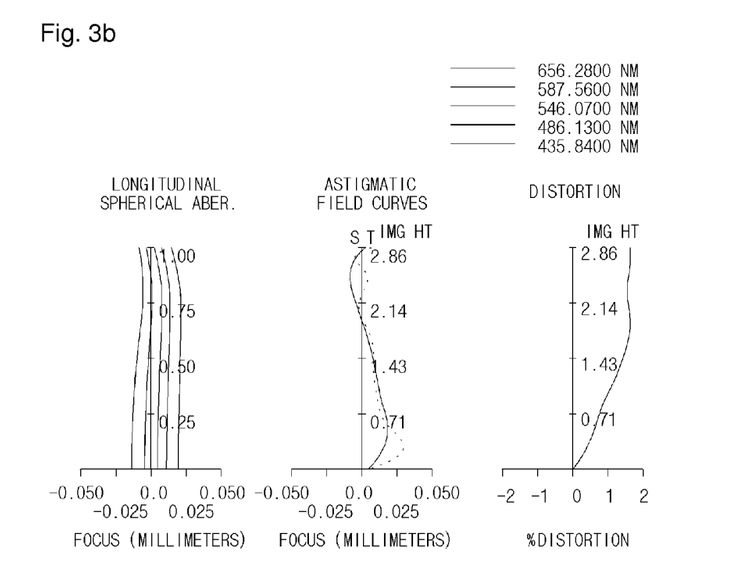
Figure 3C:
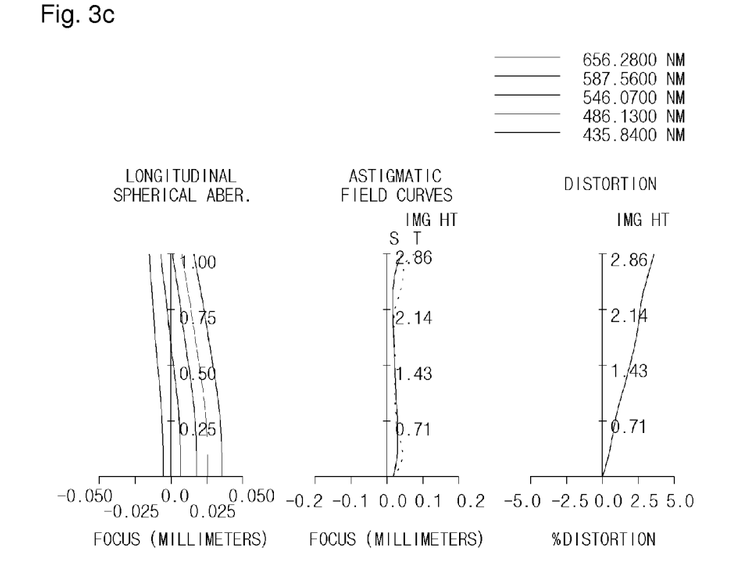

FIGS. 3a, 3b and 3c are graphs illustrating an aberration at zoom positions 1, 2 and 3 according to an exemplary embodiment of the present invention.

That is, FIGS. 3a, 3b and 3c are graphs measuring longitudinal spherical aberration, astigmatic field curves and distortion in order from left side. In FIGS. 3a, 3b and 3c, a Y axis means size of an image, and an X axis means focal distance (unit: mm) and distortion degree (unit: %). In FIGS. 3a, 3b and 3c, it is interpreted that an aberration correcting function is good as curves approach the Y axis. In the shown aberration diagram, because values of images in nearly all fields appear proximate to the Y axis, spherical aberration, astigmatic field curves and distortion all demonstrate a superior figure.

That is, a range of the longitudinal spherical aberration is −0.021 mm~+0.0125 mm, a range of astigmatic field curves is −0.013 mm~+0.014 mm, and a range of distortion is −1.80 mm~+0.53 mm, such that the imaging lens according to the present invention can correct the characteristics of spherical aberration, astigmatic field curves and distortion, whereby the imaging lens according to the present invention has an excellent lens characteristics.

FIG. 3a is a graph where an aberration is measured at the zoom position 1 of an infinite position, FIG. 3b is a graph where an aberration is measured at the zoom position 2 of 60 cm (middle) position, and FIG. 3c is a graph where an aberration is measured at the zoom position 3 of 10 cm (wide) position.

Figure 4A:
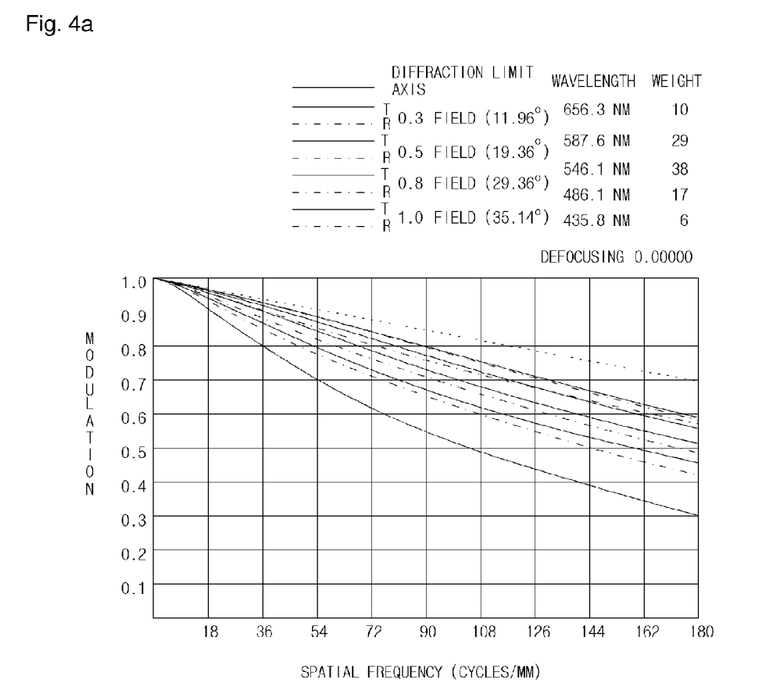
FIGS. 4a, 4b and 4c are graphs illustrating an MTF (Modulation Transfer Function) characteristic relative to spatial frequency at zoom positions 1, 2 and 3.
Figure 4B:
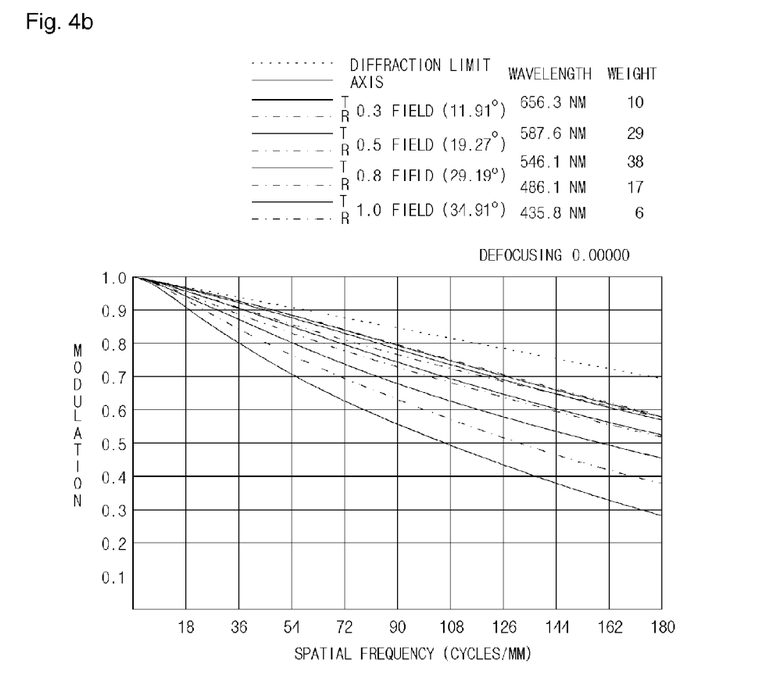
Figure 4C:
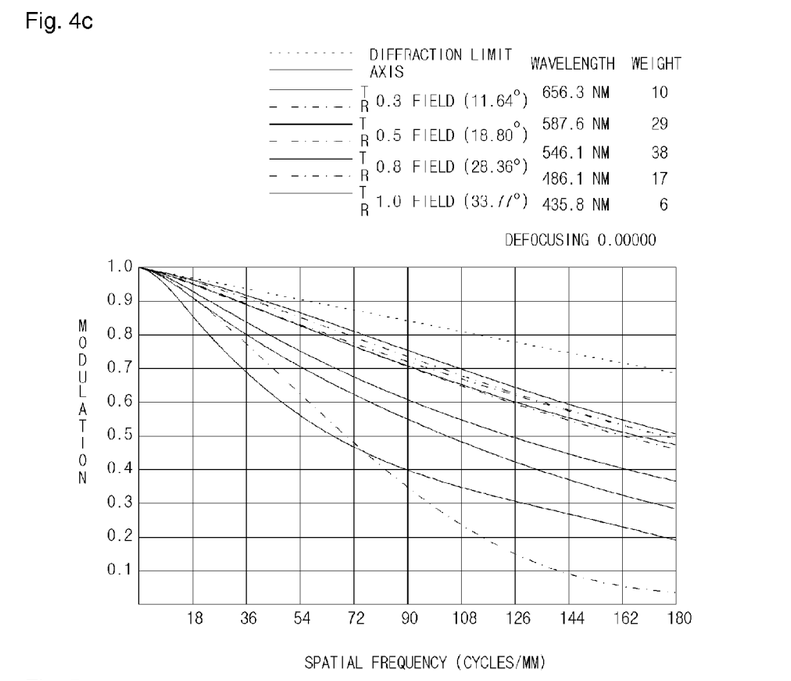

FIGS. 4a, 4b and 4c are graphs illustrating an MTF (Modulation Transfer Function) characteristic relative to spatial frequency at zoom positions 1, 2 and 3.

FIG. 4 has measured an MTF characteristic depending on a variation of spatial frequencies at cycle per millimeter (cycle/mm). Here, an MTP characteristic refers to a rate obtained by calculating a difference between light starting from an original subject surface and a formed image that passes through a lens, wherein a case of MTF figure '1' is the most idealistic, and as MTF values decrease, resolution falls down.

Referring to FIGS. 4a, 4b and 4c, since FIGS. 4a, 4b and 4c indicating that an MTF value is high at zoom positions 1, 2 and 3, it can be known that the imaging lens according to an embodiment is superior in optical performance.

For reference, FIG. 4a is an MTF (Modulation Transfer Function) characteristic relative to spatial frequency at zoom position 1 of an infinite position, FIG. 4b is an MTF (Modulation Transfer Function) characteristic relative to spatial frequency at zoom position 2 of 60 cm position, and FIG. 4c is an MTF (Modulation Transfer Function) characteristic relative to spatial frequency at zoom position 3 of 10 cm position.

Figure 5A:
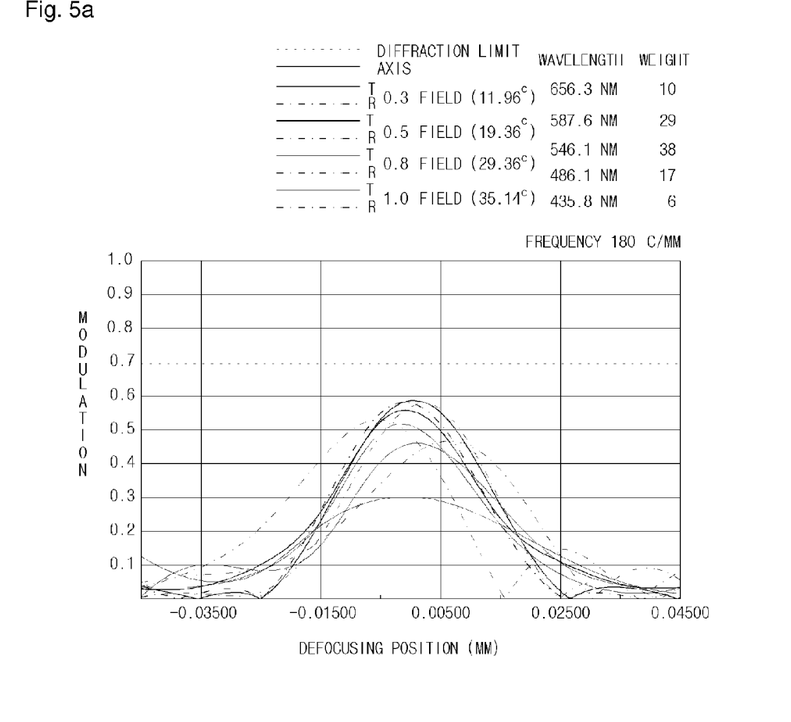
FIGS. 5a, 5b and 5c are graphs illustrating MTF characteristics relative to defocusing positions at zoom positions 1, 2 and 3.
Figure 5B:
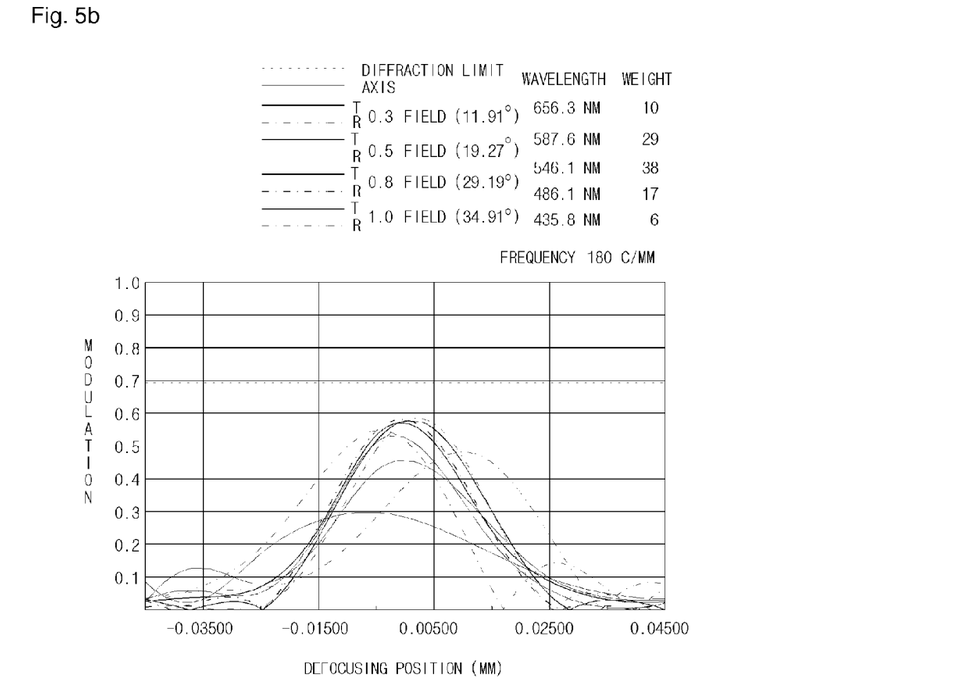
Figure 5C:
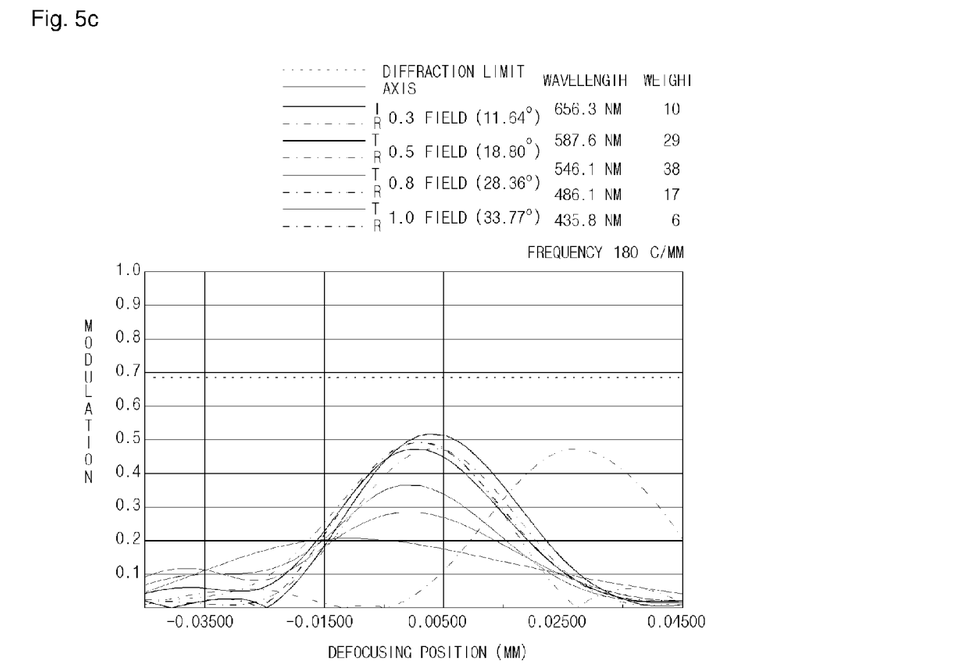

FIGS. 5a, 5b and 5c are graphs illustrating MTF characteristics relative to defocusing positions at zoom positions 1, 2 and 3, where a frequency is 180 c/mm of through focus MTF.

Furthermore, FIG. 5a is an MTF (Modulation Transfer Function) characteristic relative to defocusing position at zoom positions 1 of an infinite position, FIG. 5b is an MTF (Modulation Transfer Function) characteristic relative to defocusing position at zoom positions 2 of 60 cm position, and FIG. 5c is an MTF (Modulation Transfer Function) characteristic relative to defocusing position at zoom position 3 of 10 cm position, The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

As apparent from the foregoing, the imaging lens according to the exemplary embodiments of the present invention has an industrial applicability in that a compact, zoom type and high resolution imaging lens having a high power structure can be realized.

The invention claimed is:

1. An imaging lens, the imaging lens comprising, in an ordered way from an object side:
   a first movable lens having a positive (+) refractive power;
   a second lens having a negative (−) refractive power;
   a third lens having a positive (+) refractive power;
   a fourth lens having a positive (+) refractive power; and
   a fifth lens having a negative (−) refractive power,
   wherein the imaging lens meets a conditional expression of 0.8<f3/f1<1.0,
   where f1 and f3 are focus distances (focal lengths) of the first and third lenses, respectively.

2. The imaging lens of claim 1, wherein the second lens is concavely formed with a negative (−) refractive power.

3. The imaging lens of claim 1, wherein the third lens has a meniscus shape convexly formed at an object side surface.

4. The imaging lens of claim 1, wherein the fourth lens has a meniscus shape.

5. The imaging lens of claim 1, wherein the third lens is formed at a front surface with all inflection points.

6. The imaging lens of claim 1, wherein all surfaces of the third, fourth and fifth lenses are formed with one or more inflection points.

7. The imaging lens of claim 1, wherein an aperture is positioned at a front end of an object side surface of the first lens.

8. The imaging lens of claim 1, wherein the imaging lens meets a conditional expression of 0.5<f1/fz1<1.5, 0.5<f1/fz2<1.5, 0.5 <f1/fz3<1.5, where f1 is an entire focus distance (focal length) of the first lens, and fz1, fz2 and fz3 are focus distances of zoom positions 1, 2 and 3, and where the zoom position 1 is an infinite position, the zoom position 2 is a 60 cm (middle) position and the zoom position 3 is a 10 cm (wide) position.

9. The imaging lens of claim 1, wherein the imaging lens meets a conditional expression of 0.1<d1<0.4, 0.15<d3<0.54, where d1 is an air clearance between L1 center and L2 center on a zoom position 1, and d2 is an air clearance between L1 center and L2 center on a zoom position 3.

10. The imaging lens of claim 1, wherein the imaging lens meets a conditional expression of 0.5<ΣT/fz1<1.5, 0.5<ΣT/fz2<1.5, 0.5<ΣT/fz3<1.5, where ΣT is a distance from an object side surface of the first lens to an image-forming surface, and fz1, fz2 and fz3 are focus distances of zoom positions 1, 2 and 3.

11. The imaging lens of claim 1, wherein the imaging lens meets a conditional expression of 1.6<N2<1.7, 1.6<N3<1.7, 1.5<N1<1.6, 1.5<N4<1.6, 1.5<N5<1.6, where N1, N2, N3, N4 and N5 are refractive indexes of first, second, third, fourth and fifth lenses.

12. The imaging lens of claim 1, wherein the imaging lens meets a conditional expression of 20<V2<30, 20<V3<30, 50<V1<60, 50<V4 & V5<60, 50<V5<60, where V1, V2, V3, V4 and V5 are Abbe's numbers of the first, second, third, fourth and fifth lenses.

13. The imaging lens of claim 1, wherein the imaging lens meets a conditional expression of 4.7<ΣT<5.9, where ΣT is a distance from an object side surface of the first lens to an image-forming surface.

14. The imaging lens of claim 1, wherein the imaging lens meets a conditional expression of 2.0<F/#<3.0, where F/# is an F-number.

15. The imaging lens of claim 1, wherein the imaging lens meets a conditional expression of L3R1>1, L3R2>1, where a radius of curvature of a first surface of the third lens is L3R1, and a radius of curvature of a second surface of the third lens is L3R2.

16. The imaging lens of claim 1, wherein the imaging lens meets a conditional expressions of 0.8<|f2/fz1|<1.2, 0.8|f2/fz2|<1.2, 0.8<|f2/fz3|<1.2, 0.8<|f3/fz1|<3.7, 0.8<|f3/fz2|<3.7, 0.8<|f3/fz3|<3.7, 0.8<|f4/fz1|<1.0, 0.8<|f4/fz2|<1.0, 0.8<|f4/fz3|<1.0, 0.8<|f5/fz1|<0.8, 0.8<|f5/fz2|<0.8, 0.8<|f5/fz3|<0.8, where f1, f2, f3, f4 and f5 are focus distances of the first, second, third, fourth and fifth lenses, and fz1, fz2 and fz3 are focus distances of zoom positions 1, 2 and 3.

17. The imaging lens of claim 1, wherein the imaging lens meets a conditional expression of 0.7<(r3+r4)/(r3−r4)<1.0, where r3 and r4 are respectively radius of curvature of an object side surface of the second lens and radius of curvature of an image side surface.

18. The imaging lens of claim 1, wherein the imaging lens meets a conditional expression of 4.0<|(r5+r6)/(r5−r6)|<8.0, where r5 and r6 are respectively radius of curvature of an object side surface of the third lens and radius of curvature of an image side surface.

19. The imaging lens of claim 1, wherein the imaging lens meets a conditional expression of 0.4<f1/ΣT<0.8, or 2.5<|f3/ΣT|<3.0, where ΣT is a distance from an object side surface of the first lens to an image-forming surface, and f1 and f3 are focus distances of first and third lenses.

20. An imaging lens, the imaging lens comprising, in an ordered way from an object side:
   a first movable lens having a positive (+) refractive power;
   a second lens having a negative (−) refractive power;
   a third lens having a positive (+) refractive power;
   a fourth lens having a positive (+) refractive power; and
   a fifth lens having a negative (−) refractive power,
   wherein the imaging lens meets a conditional expression of L3R1>1, L3R2>1, where a radius of curvature of a first surface of the third lens is L3R1, and a radius of curvature of a second surface of the third lens is L3R2.

21. A camera module, the camera module comprising an imaging lens comprising, in an ordered way from an object side:
   a first movable lens having a positive (+) refractive power;
   a second lens having a negative (−) refractive power;
   a third lens having a positive (+) refractive power;
   a fourth lens having a positive (+) refractive power; and
   a fifth lens having a negative (−) refractive power,
   wherein the imaging lens meets a conditional expression of 0.8<f3/f1<1.0, where f1 and f3 are focus distances (focal lengths) of the first and third lenses.

22. The camera module of claim 21, wherein the imaging lens meets a conditional expression of L3R1>1, L3R2>1, where a radius of curvature of a first surface of the third lens is L3R1, and a radius of curvature of a second surface of the third lens is L3R2.

* * * * *